United States Patent [19]

Spencer et al.

[11] 4,346,875
[45] Aug. 31, 1982

[54] PASTRY CLOTH HAVING SUCTION CUPS REMOVABLY ASSOCIATED THEREWITH

[76] Inventors: Patricia J. Spencer, 805 Valley View Rd., Ft. Collins, Colo. 80524; Carrie P. DeRoeck, 8952 W. 81st La., Arvada, Colo. 80005

[21] Appl. No.: 295,221

[22] Filed: Aug. 21, 1981

Related U.S. Application Data

[63] Continuation-in-part of Ser. No. 166,757, Jul. 7, 1980, abandoned.

[51] Int. Cl.³ .................. A47J 43/00; B32B 3/12; B32B 3/16
[52] U.S. Cl. .................. 269/302.1; 160/368 R; 160/382; 248/362; 248/363; 269/21; 428/99; 428/119
[58] Field of Search .................. 160/368 R, 382; 248/362, 363; 269/21, 302.1; 428/119, 99

[56]  References Cited

U.S. PATENT DOCUMENTS

| | | | |
|---|---|---|---|
| 2,044,407 | 6/1936 | Smith | 428/119 |
| 2,183,767 | 12/1939 | Gandrud | 269/302.1 |
| 2,247,727 | 7/1941 | Henry | 248/362 |
| 2,344,549 | 3/1944 | Greenhill | 160/368 R |
| 2,815,919 | 12/1957 | Pribil | 248/363 |
| 3,091,779 | 6/1963 | Lucas et al. | 248/363 |
| 3,654,047 | 4/1972 | Berkowitz | 248/362 |
| 3,958,797 | 5/1976 | Brow | 269/302.1 |

Primary Examiner—James C. Cannon
Attorney, Agent, or Firm—Hugh H. Drake

[57]  ABSTRACT

For rolling out dough, a flexible pastry cloth includes a plurality of first fastener parts or buttonholes spaced successively around its margin. A plurality of suction cups, each securingly engageable with a flat surface, such as a tabletop or countertop, each have a second fastener part or button individually connectable removably with a corresponding part on the cloth. Engagement of the cups with the surface permits stretching of the cloth to enable rolling of the dough against the surface through the cloth. A further improvement adds a second flexible cloth affixed atop and overlying the first.

8 Claims, 7 Drawing Figures

PASTRY CLOTH HAVING SUCTION CUPS REMOVABLY ASSOCIATED THEREWITH

RELATED APPLICATION

This is a continuation-in-part of co-pending application Ser. No. 166,757, filed July 7, 1980, abandoned in favor of the present application.

The present invention pertains to a pastry cloth. More particularly, it relates to a pastry cloth assembly that includes removable means useful for mounting the assembly upon a countertop, tabletop or like surface.

Historically, the preparation of many foodstuffs has required the rolling out of dough on a flat surface. With many varieties of dough, there is a tendency of the material of the dough undesirably either to stick or slide across the underlying surface, depending upon its nature. Thus, it has long been known to cover the surface with some kind of a material such as cotton or linen and to roll out the dough on that material.

One difficulty encountered with the mere interpositioning of a soft material is its own tendency to slide upon many conventional work surfaces in use today. Another difficulty encountered has been in connection with keeping the underlying material stretched out in a flat condition.

Directing attention to the latter problem, E. S. Gandrud, in his U.S. Pat. No. 2,183,767, disclosed the use of a demountable frame for holding such a pastry cloth in a stretched condition while it was mounted on a countertop. Other prior patentees have suggested the use of suction cups for holding a pastry cloth assembly securely to a countertop. Exemplary of this is U.S. Pat. No. 3,958,797-Brow. Brow solves the problem of sliding by mounting the pastry cloth in a complicated assembly which is analogous to an embroidery frame and, in turn, securing that frame to the countertop by use of the suction cups.

Other prior patentees that have employed suction cups, one way or another, to somehow mount a flexible sheet to a substrate include U.S. Pat. Nos.:

2,247,727 to Henry
2,344,549 to Greenhill
2,815,919 to Pribil
3,091,779 to Lucas
3,654,047 to Berkowitz However, these references do not address any problem in the environment of rolling out pastry. Cumulatively, they are deficient for this particular art in one or more of not providing positive lateral engagement as between the attaching devices and the principal sheet of material, there is undue complexity in manufacture in order to provide cooperation of the different elements and/or there is nothing for arranging a pastry cloth to be secure in use and yet permit rolling of the dough directly against the underlying surface through the pastry cloth itself.

It is, accordingly, a general object of the present invention to provide a new and improved pastry cloth assembly.

Another object of the present invention is to provide a new and improved securable pastry cloth which is composed of the minimum number of elements.

A further object of the present invention is to provide a new and improved pastry cloth assembly that best achieves the objectives of certain of the prior-art approaches while yet avoiding the deficiencies thereof.

Still another object of the present invention is to provide a new and improved pastry cloth that enables compliances with regulations imposed upon commercial establishments.

In accordance with the present invention, a pastry cloth assembly includes a sheet of flexible cloth of a material suitable for the rolling-out thereon of dough in the preparation of a food. A plurality of first fastener parts are spaced successively around a peripheral margin of the cloth. A plurality of suction cups, each securingly engageable with a flat surface and each having a second fastener part individually connectable removably with a respective one of the first fastener parts, are included on the underside to permit engagement of the cups with the surface and enable stretching of the cloth and subsequent rolling of the dough against the surface through the cloth. Various additional attributes include a second sheet that may be separately washable.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
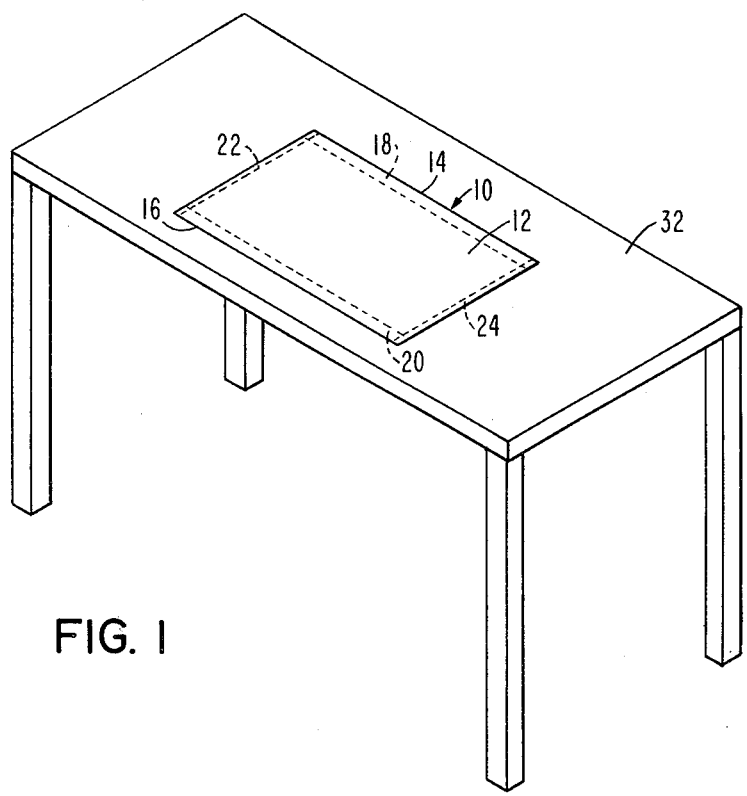
FIG. 1 is an isometric view of a table on which a pastry cloth assembly is disposed.

A pastry cloth assembly 10 includes a sheet 12 of a flexible cloth. The cloth is of a material suitable for the rolling out thereon of a dough when the cloth is placed upon a hard substrate such as a countertop. Of course, such usage of a pastry cloth is well known in the art of preparing a foodstuff. The material of such a cloth typically is either a cotton or a linen.

In this case, sheet 12 is in the shape of an elongated rectangle. Its two longer sides 14 and 16 are turned under re-entrantly and stitched to form hems 18 and 20. Its space-opposed shorter sides again preferably are turned under and hemmed as indicated at 22 and 24.

Spaced along each of hems 18 and 20 are a plurality of first fastener parts 26 each preferably and in this case in the form of a simple stitch-bounded buttonhole. Removably connectable within each such buttonhole is the nub or button 28 on the upper side of a suction cup 30. Thus, buttons 28 form a second fastener part individually connectable with a respective one of the first fastener parts.

In use as shown in FIG. 1, engagement of suction cups 30 with an underlying surface 32 permits stretching of the cloth of sheet 12 over the surface. This enables the rolling of dough upon the cloth without encountering wrinkles. At the same time, the cloth is held in place so that it does not slide across the surface during the rolling operation. Moreover, the manner of securement is such that the operation of rolling the dough is enabled to occur against the underlying surface 32 by reason of the flexibility in the cloth.

Figure 2:
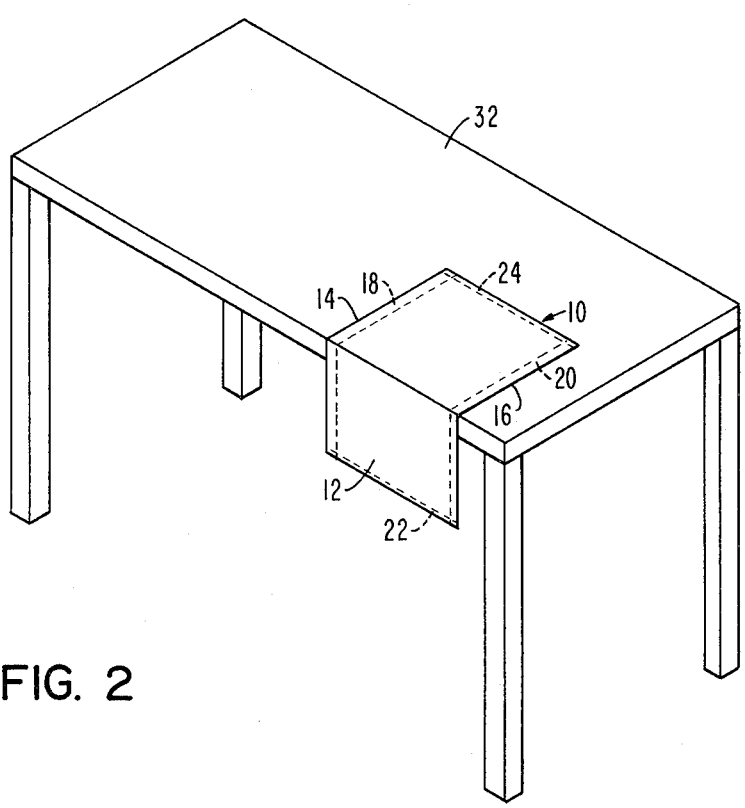
FIG. 2 is a similar view but with the pastry cloth assembly disposed in a different position.
Figure 3:
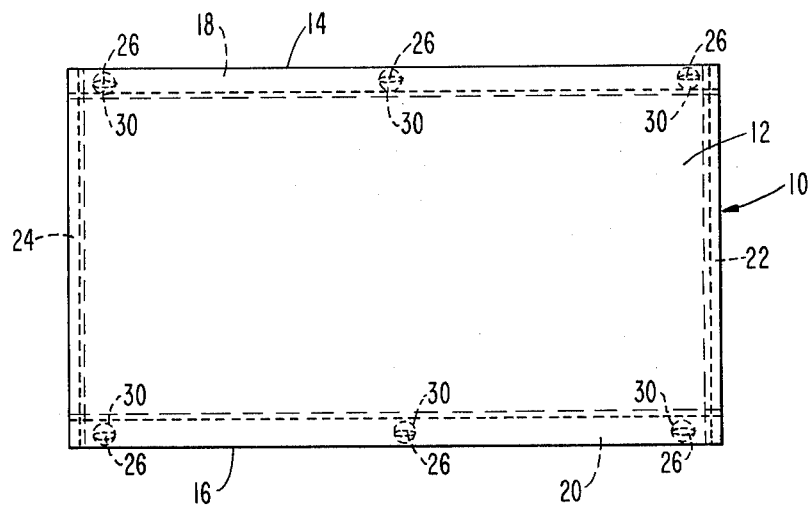
FIG. 3 is a top plan view of the pastry cloth assembly shown in FIGS. 1 and 2.
Figure 4:
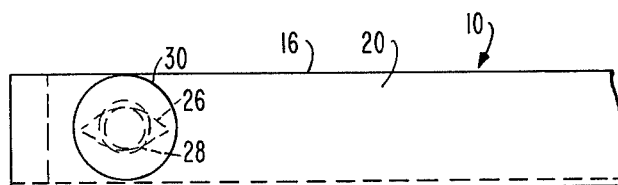
FIG. 4 is a fragmentary bottom plan view of a portion of the assembly shown in FIG. 3.
Figure 5:
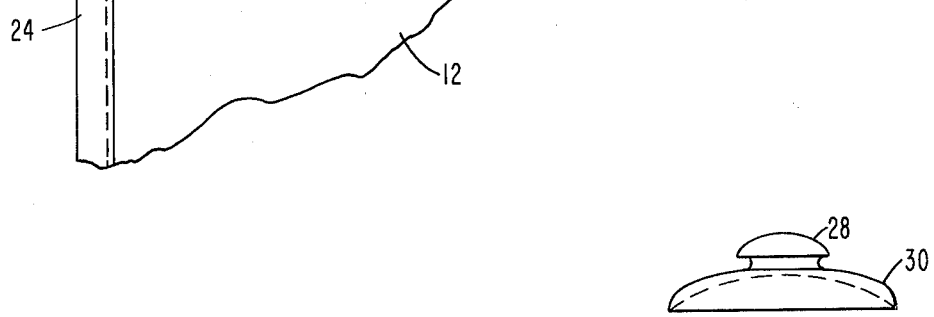
FIG. 5 is a side elevational view of a component included in the assembly of FIGS. 3 and 4.

The preferred elongated rectangular form of the pastry cloth as illustrated accommodates the usually desired area of a countertop or table available in many kitchens. When, however, the working space available, for any reason, is less than that which corresponds to the dimensions of the cloth, a portion of the cloth may be draped over the front of the table or counter as shown in FIG. 2, so that less than all of the suction cups are employed.

The arrangement presented at least approaches the utmost in simplicity for a pastry cloth assembly that yet permits its firm and secure mounting on at least almost any kind of working surface. Besides the pastry cloth assembly, nothing extra is required for the attainment of such mounting. Moreover, the resulting secure assembly also avoids the need for any extra underlying substrate to serve as the surface against which the dough is rolled, that is, the countertop or tabletop itself is used for that purpose just as in the case of merely putting a loose cloth thereupon.

As also will be readily apparent, the suction cups themselves are readily removable for the purpose of enabling laundrying of the pastry cloth itself in any manner desired. On the other hand, the entire assembly might be washed while still combined. Of course, snap-type or other fastening means may be substituted for the buttonhole arrangement shown.

To the extent so far described, assembly 10 is entirely suitable for home use. The user normally will accomplish the task and then wash the assembly, with or without attachment of the suction cups, in water at a temperature insufficient to cause shrinking of the cotton-duck type of material preferred by bakers for the rolling out of dough. A so-called duck material is one which exhibits a granular surface but yet which is very flexible as in traditional linen.

Using the desired cotton duck material for sheet 12, it normally is preferred to use a so-called cold-water wash so as to prevent undue shrinkage. While such material may be pre-treated to minimize shrinkage, that unnecessarily increases costs. Thus, it is preferred to manufacture assembly 10 with untreated material for use by the homemaker.

A rather different situation exists in the environment of a commercial establishment such as a bakery or a restaurant. In that environment, there well may be a regulatory requirement that anything which contacts a foodstuff under preparation be frequently laundered or otherwise cleaned. One acceptable answer is to use only surfaces made of a material such as stainless steel. As all pastry producers know, however, dough cannot be rolled out upon a surface such as stainless steel nearly as nicely as when rolling it out on a suitable cloth.

For economy when a cloth is used, the proprietor retains the services of a commercial laundry. A used pastry cloth most conveniently is sent to that commercial laundry along with all sorts of other material such as tablecloths and napkins. At such a laundry, everything received is washed in very hot water. Such a laundry, at least normally, can't be bothered with detaching such items as suction cups. The water temperature is such that anything which is not pre-shrunk will be distorted. All considered, it often just is not practical to send assembly 10 to a commercial laundry.

Figure 6:
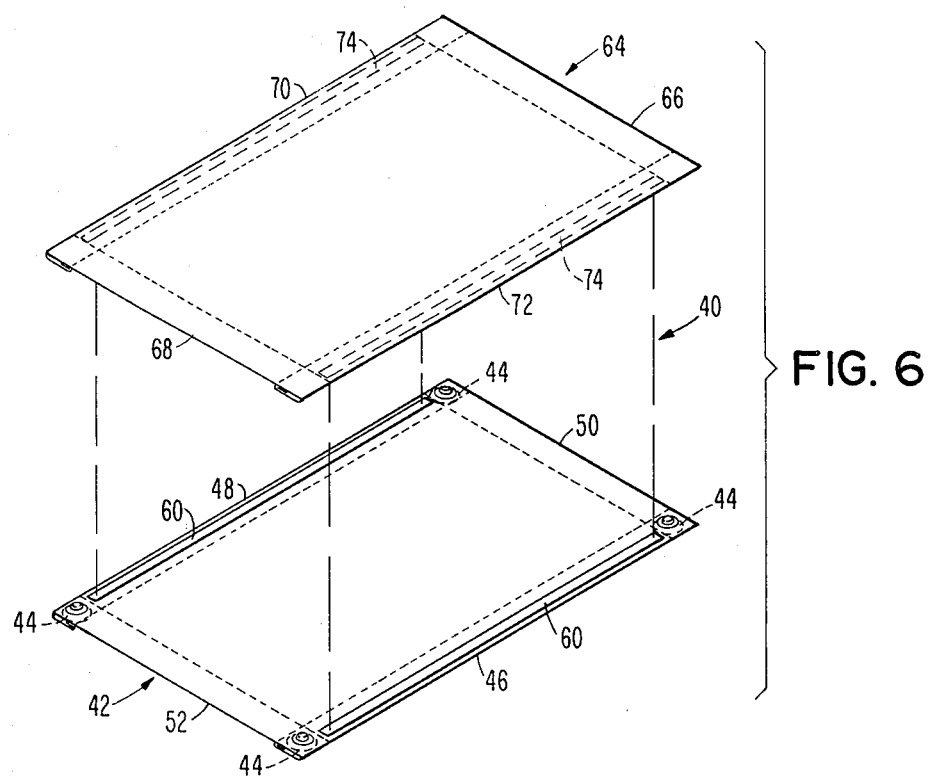
FIG. 6 is an exploded isometric view of a further embodiment.

The embodiment of FIG. 6 addresses these problems. The basic flexible fabric, secured to the countertop by its affixed suction cups, is not exposed directly to the foodstuff. Thus, it can be left in place for a longer time and, at a convenient interval, may be separately laundered with a low-water-temperature approach that will preserve integrity of the cloth as well as of the affixed suction cups. The principal difference in FIG. 6 is that a second working sheet is affixed a top the underlying sheet.

Figure 7:
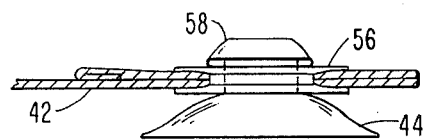
FIG. 7 is an enlarged fragmentary cross-sectional view of an assembly included in FIG. 6.

In more detail, an assembly 40 includes a first sheet 42 of a flexible material such as cotton-duck that has not been treated for shrinkage. Near each of the four corners of sheet 42 are suction cups 44. At those locations, grommets 56 have been secured through the material of sheet 42 as shown in FIG. 7. More specifically, space-opposed lateral hems 46 and 48 are formed by stitching or otherwise along respective margins and end hems 50 and 52 are similarly sewed along the other space-opposed margins. At each location of a suction cup 44, the grommet 56 is punched through the material of sheet 42 and secured in place. Each suction cup 44 includes a nub 58 seatable within the interior cavity defined within a grommet 56.

In the version illustrated, grommet 56 extends through both layers of the hem. Depending upon the machinery employed to form the hems, this may be preferred to allow stitching the hems in advance and thereafter affix the grommets. Alternatively, it may be preferable to allow the grommet to be assembled before stitching of the hem, so that it extends through only the bottom layer of the associated one of hems 46 and 48. In principle, hems are not required. Of course, they add strength and avoid fraying.

On the upper side of sheet 42, a first Velcro fastener 60 is disposed along the margin defined by each of hems 46 and 48. Mateable to sheet 42 is a second sheet of flexible material 64. Sheet 64 in this case likewise includes space opposed end hems 66 and 68 as well as side hems 70 and 72. Individually disposed on side hems 70 and 72 in this particular embodiment are Velcro fasteners 74 which individually mate with and attach to corresponding ones of Velcro fasteners 60 when those parts are pressed together.

In use, sheet 42 is affixed against the countertop in the manner previously described. Suction cups 44 permit the sheet to be stretched when in place upon that countertop. Sheet 64, by use of Velcro fastenings 60 and 74, is affixed atop sheet 42 so as to provide the upper surface against which the dough is placed. Since both sheets are flexible, the dough ends up being rolled against the underlying countertop through both of sheets 64 and 42.

The material of sheet 64 preferably is a polyester duck material. It, and its Velcro fasteners, are readily washable, without shrinkage or other deterioration, by a commercial laundry. Thus, the portion of the overall assembly that is exposed to the foodstuff being worked upon can frequently be removed and replaced, the removed part being sent to the laundry in ordinary course. On the other hand, the user can have the advantage of more infrequent laundering, perhaps in-house, of the underlying subassembly of sheet 42 and its annexed suction cups 44. While the overall assembly of FIG. 6 is more expensive than that of the earlier embodiment, in that it involves the addition of a separate layer and the inclusion of Velcro or equivalent fasteners, it resolves the aforementioned other problems that arise by reason of health regulations and the attendent practical necessity of using a commercial laundry.

One result of using the embodiment of FIGS. 6 and 7 is that the basic simplicity of the earlier embodiment is preserved with respect to mounting and stretching upon the underlying countertop. Yet, there is a readily-launderable overlying contact surface. At the same time, reliance continues to be entirely upon the underlying countertop as the surface against which the dough is worked.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. A pastry cloth assembly comprising:
    a sheet of flexible cloth, of a material suitable for the rolling-out thereon of dough in the preparation of a food, having a peripheral margin;
    a plurality of first fastener parts spaced successively around said margin;
    and a plurality of suction cups each securingly engageable with a flat surface and each having a second fastener part individually connectable removably with a respective one of said first fastener parts to dispose all of said suction cups on a single major surface of said cloth, engagement of said cups with said surface permitting stretching of said cloth to enable rolling of said dough against said surface through said cloth.

2. A pastry cloth as defined in claim 1 in which said cloth includes first and second hems formed in respective opposing portions of said margin, and in which said first fastener parts are distributed along said hems.

3. A pastry cloth as defined in claim 1 in which said first fastener parts are buttonholes formed in said cloth, and in which said second fastener parts are buttons formed on said suction cups and engageable within said buttonholes.

4. A pastry cloth as defined in claim 1 in which said cloth forms an elongated rectangle, and in which said suctions cups are distributed around said margin in a pattern to permit less than all of said cups to secure only a portion of said cloth to said surface while permitting a remaining portion of said cloth to hang over an edge of said surface.

5. A pastry cloth assembly comprising:
    a sheet of flexible cloth, of a material suitable for the rolling-out thereon of dough in the preparation of a food, having a peripheral margin;
    first and second hems formed in respective opposing portions of said margin;
    a plurality of buttonholes formed in a single layer of each of said hems and individually spaced successively along said hems;
    and a plurality of suction cups each securingly engageable with a flat surface and each having a button formed thereon and individually connectable removably with a respective one of said buttonholes to dispose all of said suction cups on a single major surface of said cloth, engagement of said cups with such surface permitting stretching of said cloth to enable rolling of said dough against said surface through said cloth.

6. A pastry cloth assembly comprising:
    a first sheet of flexible cloth, of a material suitable for the rolling-out thereabove of dough in the preparation of a food, having a peripheral margin;
    a plurality of first fastener parts spaced successively around said margin;
    a plurality of suction cups each securingly engageable with a flat surface and each having a second fastener part individually connectable with a respective one of said first fastener parts, engagement of said cups with said surface permitting stretching of said cloth to enable rolling of said dough against said surface through said first sheet;
    a second sheet of flexible cloth, of a material suitable for the rolling-out thereon of dough in the preparation of a food, alignable over said first sheet;
    and means for removably securing said second sheet atop said first sheet, allowing said dough to be rolled out against said surface through both of said sheets.

7. A pastry cloth as defined in claims 1 or 6 in which said first fastener parts are grommets secured through a portion of said margin, and in which said second fastener parts include means engageable within said grommets.

8. A pastry cloth as defined in claim 6 in which said second sheet is non-shrinking when subjected to immersion in hot water.

* * * * *